United States Patent [19]

Honma et al.

[11] Patent Number: 5,043,393
[45] Date of Patent: Aug. 27, 1991

[54] PROCESS FOR PRODUCING FLUORINE-CONTAINING COPOLYMER AND FLUORINE-CONTAINING COPOLYMER COMPOSITION

[75] Inventors: Shiro Honma; Takashi Izumi; Hajime Inagaki; Sakae Murakami, all of Kuga, Japan

[73] Assignee: Mitsui Petrochemical Industries, Ltd., Tokyo, Japan

[21] Appl. No.: 444,401

[22] Filed: Dec. 1, 1989

[30] Foreign Application Priority Data

Dec. 2, 1988 [JP] Japan .................................. 63-305443
Dec. 6, 1988 [JP] Japan .................................. 63-308393

[51] Int. Cl.$^5$ ................................................ C08F 8/00
[52] U.S. Cl. .................................. 525/326.3; 525/360; 525/359.1; 525/359.3; 525/359.4; 524/545; 524/546
[58] Field of Search .................. 525/326.3, 360, 359.1, 525/359.3, 359.4; 524/545, 546

[56] References Cited

U.S. PATENT DOCUMENTS 4,345,057  8/1982  Yamabe et al. ..................... 526/247
4,701,508 10/1987  Homma et al. ..................... 526/249
4,886,862 12/1989  Kuwamura et al. ............. 525/326.3

FOREIGN PATENT DOCUMENTS 1234034  6/1971  United Kingdom .

Primary Examiner—Joseph L. Schofer
Assistant Examiner—N. Sarofim
Attorney, Agent, or Firm—Sherman and Shalloway

[57] ABSTRACT

According to the present invention, there is provided an improvement of a process for producing fluorine-containing copolymers comprising copolymerizing (a) a chlorinated fluoroolefin,
(b) vinyl ether, and
(c) an organosilicon compound having an olefinically unsaturated bond and a hydrolyzable bond, the improvement resides in that a chlorine trapping agent is allowed to exist in the system during the copolymerization reaction and/or the purification of the resulting copolymer, and the fluorine-containing copolymers are free from coloration.

Further, according to the present invention, a fluorine-containing copolymer composition containing a specific curing catalyst is also provided and said composition is excellent in adhesion to substrates or base materials.

10 Claims, No Drawings 5,043,393

PROCESS FOR PRODUCING FLUORINE-CONTAINING COPOLYMER AND FLUORINE-CONTAINING COPOLYMER COMPOSITION

FIELD OF THE INVENTION

This invention relates to a process for producing fluorine-containing copolymers, which can be used for producing fluorine-containing copolymers free from coloration and are soluble in organic solvents and quickly curable at ordinary temperature. It also relates to fluorine-containing copolymer compositions and more particularly to fluorine-containing copolymer compositions which can be used as coating capable of forming coating films excellent in adhesion to substrates.

BACKGROUND OF THE INVENTION

In the fields of applications of exterior coatings to architectural structures, wheeled vehicles, ships, aircraft, etc., there are utilized high-quality polyester or acryl type exterior coatings, since the coatings used for the purpose intended are required to have excellent weathering resistance and performance properties. However, outdoor durable years of the coatings are short and even the above-mentioned high-quality coatings will lose their fine appearance and substrate protective properties in several years.

Because of their being excellent in thermal and chemical stability, weathering resistance, water resistance, chemical resistance, solvent resistance, nonadhesive properties, low friction characteristics and water repellency, fluorine containing polymers are suitable for use as surface treatment agents for various kinds of substrates or base materials. However, on account of their excellent properties as mentioned above, conventional known fluorine-containing polymers are difficult to use as coating materials because they are not readily soluble in organic solvents and it is hard to form films thereof. For instance, most of the coating materials of fluorine-containing polymers known at present are powder coatings except for PVdF (polyvinylidene fluoride) which is used as an organic solvent dispersible type coating by utilizing its properties of being soluble in specific solvents at elevated temperatures. Moreover, since coating materials of fluorine-containing polymers mentioned above require high temperature baking at the time when their films are formed, the field in which they are used is limited to such places where heating equipment can be arranged. Furthermore, such heating equipment and baking step as required for the utilization of these coating materials are undesirable from the standpoint of the safety of workers engaged in the coating operation or the work environment. Consequently, various attempts have been made in recent years to develop fluorine-containing polymers which are soluble in solvents or which do not require a high temperature baking step.

For example, Japanese Patent Laid-Open Publn. No. 34107/1982 discloses quaternary copolymers comprising fluoroolefin, cyclohexyl vinyl ether, alkyl vinyl ether and hydroxyalkyl vinyl ether, and said copolymers being alleged to be soluble in organic solvents and capable of curing at ordinary temperature. However, for curing these copolymers at ordinary temperature, it is necessary to use melamine type hardeners or urea resin type hardeners, and the use of these hardeners results in lowering in weathering resistance. Furthermore, the glass transition temperature of these copolymers are relatively high such as above ordinary temperature, i.e. 25° C.. Moreover, Japanese Patent Publn. No. 39472/1971 suggests, though no concrete example is shown, that polymers obtained by mechanically treating PTFE (polytetrafluoroethylene) with organosilicon compounds having olefinically unsaturated bonds and hydrolyzable groups in the presence of such radical initiators as organic hydroperoxide are crosslinked and cured with water at ordinary temperature. The fluorine-containing polymers according to the above process, however, are polymers in which the organosilicon compounds have grafted on PTFE and are substantially insoluble in organic solvents.

Under the circumstances, the present inventors proposed, in Japanese Patent Application No. 263017/1984, solvent-soluble fluorine-containing copolymers and coating compositions comprising such fluorine-containing copolymers dissolved in organic solvents, said copolymers characterized by that (1) they are soluble in organic solvents at low temperature,
(2) they require no specific hardener at the time of curing,
(3) they are cured at ordinary temperature,
(4) they are excellent in weathering resistance, water resistance, chemical resistance, solvent resistance and low friction characteristics after curing, and
(5) they are fluorine-containing copolymers which can be polymerized directly from monomer components,
 [A] said copolymers being obtained by copolymerizing substantially
  (a) fluoroolefin,
  (b) vinyl ether, and
  (c) an organosilicon compound having an olefinically unsaturated bond and a hydrolyzable group,
 [B] said copolymers comprising, based on the total mole number of said (a) to (c) in the copolymers, 30–70 mol % of (a), 20–60 mol % of (b) and 1–25 mol % of (c) and
 [C] said copolymers having a number average molecular weight
  ($\overline{M}n$) of 3000–200000 as measured by gel permeation chromatography.

Though the above fluorine-containing copolymers have excellent characteristics, there is such a problem that when chlorinated fluoroolefins are used as (a) fluoroolefins, the resulting fluorine-containing copolymers are colored yellow, etc. Accordingly, coating compositions comprising the fluorine-containing copolymers dissolved in organic solvents have such a problem that when substrates or base materials are coated with the coating compositions, the resulting coating films are colored yellow.

Accordingly, it is an object of this invention to develop a process for producing a fluorine-containing copolymer which does not cause coloration and is soluble in organic solvents and curable at ordinary temperature.

Further, it has been found that coating compositions containing the above-described fluorine-containing copolymers are not considered to be fully satisfying with respect to the adhesion of their coating films to substrates or base materials. Namely, it has been found that such coating films are poor in adhesion strength as compared to coating films formed from epoxy resin primers after the lapse of a long period of time from application, although such coating films are excellent in adhesion to coating films formed from the epoxy resin primers for a short period of time from application.

Epoxy resins are most widely used as a vehicle for coatings. Hence, epoxy resin type coatings are often used together with other coatings, for example, by means of wet-on-wet coating. Accordingly, good adhesion to epoxy resins is often required in the field of coatings.

In practical coating work, there is often a possibility that a long time elapses before a top coating is applied after application of epoxy type coatings.

Accordingly, it is an object of the present invention to develop a fluorine-containing copolymer composition which gives a coating film excellent in adhesion to substrates.

OBJECT OF THE INVENTION

The present invention is intended to solve such problems associated with the prior art as mentioned above and an object of the present invention is to provide a process for producing fluorine-containing copolymers which are free from coloration and are soluble in organic solvents and curable at ordinary temperature.

Another object of the present invention is to provide fluorine-containing copolymer compositions which give coating films excellent in adhesion to substrates or base materials.

SUMMARY OF THE INVENTION

In a process for producing fluorine-containing copolymers by copolymerizing
(a) a chlorinated fluoroolefin,
(b) vinyl ether, and
(c) an organosilicon compound having an olefinically unsaturated bond and a hydrolyzable group,
the improvement according to the present invention resides in that a chlorine trapping agent is allowed to exist in the system during the copolymerization reaction and/or the purification of the resulting copolymer.

In the present invention, fluorine-containing copolymers free from coloration can be obtained, because a chlorine trapping agent is allowed to exist in the system during the copolymerization reaction and/or the purification of the resulting copolymer in the production of the fluorine-containing copolymers as described above.

The fluorine-containing copolymer compositions of the present invention comprise:
[A] a fluorine-containing copolymer obtained by copolymerizing
  (i) a fluoroolefin,
  (ii) an alkyl vinyl ether,
  (iii) vinyl ester of a carboxylic acid, and
  (iv) an organosilicon compound having an olefinically unsaturated bond and a hydrolyzable group;
[B] a curing catalyst represented by the following formula $$R^1 - SnX^1X^2Y^1$$

wherein $R^1$ is an alkyl group having 4 to 10 carbon atoms, $X^1$ and $X^2$ may be the same or different and each is Cl or OH group, and $Y^1$ is Cl or $OCOR^2$ group (wherein $R^2$ is an alkyl group, an aryl group or an allylalkyl group); and

[C] organic solvent(s).

Coating films formed from the fluorine-containing copolymer compositions of the present invention are excellent in adhesion to substrates or base materials and have excellent properties such as weathering resistance, water resistance, chemical resistance, water repellency, low friction characteristics, etc.

DETAILED DISCLOSURE OF THE INVENTION

First, the process for producing fluorine-containing copolymers according to the present invention will be illustrated in more detail below.

The fluorine-containing copolymers produced by the present invention are copolymers composed of structural units derived from three kinds of monomers of (a) a chlorinated fluoroolefin, (b) vinyl ether and (c) an organosilicon compound having an olefinically unsaturated bond and a hydrolyzable group. So long as the objects of the present invention are not marred, the present copolymers may further be copolymerized with small amounts of other copolymerizable monomers such as α-olefins, cycloolefins, vinyl esters of carboxylic acids, allyl esters of carboxylic acids, etc.

The fluoroolefin (a) which is used in the present invention has in the molecule at least one fluorine atom and chlorine atom and preferably includes perhaloolefins in which halogen atoms of the olefin have all been substituted with fluorine atoms, chlorine atoms and other halogen atoms. From the standpoint of polymerizability and the properties of the resulting polymers, fluoroolefins having 2 or 3 carbon atoms are preferable.

Examples of such fluoroolefins as mentioned above include fluoroolefins having 2 carbon atoms (fluoroethylene type) such as $CClF=CF_2$, $CHCl=CF_2$, $CCl_2=CF_2$, $CClF=CClF$, $CHF=CCl_2$, $CCl_2=CClF$, etc.; fluoroolefins having 3 carbon atoms (fluoropropene type) such as $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CCl_3CF=CF_2$, $CF_3CF=CHCl$, $CClF_2CF=CHCl$, $CCl_3CF=CHCl$, $CF_2ClCF=CF_2$, $CH_2BrCF=CCl_2$, etc.; and fluoroolefins having 4 or more carbon atoms such as $CF_3CCl=CFCF_3$, $CF_2=CFCF_2CClF_2$, $CF_2=CFCF_2CCl_3$, $CH_2=CFCCl_2CC_3$, $CF_3(CF_2)_2CCl=CF_2$, $CF_3(CF_2)_3CCl=CF_2$, etc.

Among them, fluoroethylenes and fluoropropenes are preferred as mentioned previously, and particularly chlorotrifluoroethylene ($CClF=CF_2$) is preferred.

These fluoroolefins may be used either alone or as a mixture of two or more of them in the present invention.

The vinyl ether (b) which is used in the present invention signifies compounds having ether linkage of vinyl group with alkyl group, cycloalkyl group, aryl group, or aralkyl group or the like group.

Examples of such vinyl ethers as mentioned above include chain alkyl vinyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether and 4-methyl-1-pentyl vinyl ether; cycloalkyl vinyl ethers such as cyclopentyl vinyl ether and cyclohexyl vinyl ether; aryl vinyl ethers such as phenyl vinyl ether; and aralkyl vinyl ethers such as benzyl vinyl ether and phenethyl vinyl ether.

Of these mentioned above, preferred are chain alkyl vinyl ethers having not more than 8 carbon atoms, particularly 2 to 4 carbon atoms and cycloalkyl vinyl ethers having 5 to 6 carbon atoms. More preferably are ethyl vinyl ether, propyl vinyl ether, butyl vinyl ether and cyclohexyl vinyl ether.

These vinyl ethers may be used either alone or as a mixture of two or more of them in the present invention.

The organosilicon compound (c) may be those having in the molecule olefinically unsaturated bonds and hydrolyzable groups, and concretely they may be exemplified by way of such compounds as represented by the following general formulas (1) to (3).

$$R^1R^2SiY^1Y^2 \quad (1)$$

$$R^1XSiY^1Y^2 \quad (2)$$

$$R^1SiY^1Y^2Y^3 \quad (3)$$

wherein $R^1$ and $R^2$ may be the same or different and each is a group having olefinically unsaturated bond or bonds and consisting of carbon, hydrogen and optionally oxygen, X is an organic group having no olefinically unsaturated bond, and $Y^1$, $Y^2$ and $Y^3$ may be the same or different and each is a hydrolyzable group.

Concrete examples of $R^1$ and $R^2$ include vinyl, allyl, butenyl, cyclohexenyl and cyclopentadienyl, particularly preferred are each a terminal olefinically unsaturated group. Other examples of $R^1$ and $R^2$ include such groups having ester linkages of terminal unsaturated acids as $CH_2=CH-O(CH_2)_3-$, $CH_2=C(CH_3)COO(CH_2)_3-$, $CH_2=C(CH_3)COO(CH_2)_2-O-(CH_2)_3-$,

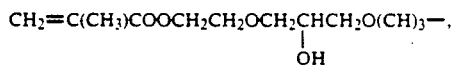

Of these $R^1$ and $R^2$ groups, those consisting of carbon and hydrogen and containing no oxygen are preferable, and vinyl group is most preferred.

Concrete examples of X include monovalent hydrocarbon radicals such as methyl, ethyl, propyl, tetradecyl, octadecyl, phenyl, benzyl tolyl groups and these groups may be halogen-substituted hydrocarbon radicals.

Concrete examples of $Y^1$, $Y^2$ and $Y^3$ include such alkoxy and alkoxyalkoxy groups as methoxy, ethoxy, butoxy and methoxyethoxy, such acyloxy group as formyloxy, acetoxy and propionoxy, oxim, e.g., $-ON=C(CH_3)_2$, $-ON=CHCH_2C_2H_5$ and $-ON=C(C_6H_5)_2$, and other hydrolyzable organic radicals.

The organosilicon compounds which are preferably used in the present invention are those represented by the general formula (3), particularly preferred are those in which $Y^1$, $Y^2$ and $Y^3$ are the same. Of these compounds, preferable are those in which $R^1$ is vinyl group and those in which $Y^1$, $Y^2$ and $Y^3$ are alkoxy or alkoxyalkoxy groups, for example, vinyloxypropyl trimethoxysilane, vinyl trimethoxysilane, vinyl triethoxysilane, vinyl tris(methoxyethoxy)silane and the like. However, also usable are vinyl methyldiethoxysilane, vinyl phenyldimethoxysilane and the like.

In the fluorine-containing copolymers of the present invention, the structural units derived from (a) are present in an amount of 30–70 mol %, preferably 40–60 mol %, those derived from (b) are present in an amount of 20–60 mol %, preferably 20–50 mol %, and those derived from (c) are present in an amount of 1–25 mol %, preferably 3–20 mol %, based on the total mole numbers of (a)–(c).

The fluorine-containing copolymers of the present invention as illustrated above are soluble at ordinary temperature in organic solvents, for example, aromatic hydrocarbons such as benzene, toluene and xylene, ketones such as acetone and methyl ethyl ketone, ethers such as diethyl ether, dipropyl ether, methyl cellosolve and ethyl cellosolve, esters such as ethyl acetate and butyl acetate, alcohols such as ethanol, and halogenated hydrocarbons such as trichloromethane, dichloroethane and chlorobenzene.

Accordingly, coating compositions can be prepared by dissolving the fluorine-containing copolymers in organic solvents.

When the coating compositions are prepared by using the fluorine-containing copolymers, preferably used are toluene, xylene, butyl acetate, isobutyl methyl ketone, methyl cellosolve, ethyl cellosolve and mixtures thereof as organic solvents.

Since the fluorine-containing copolymers have the hydrolyzable organic radical originating from the organosilicon compound (c), a crosslinking reaction takes place between the molecular chains of the copolymers when the copolymers are exposed to water, whereby the copolymers are cured. Accordingly, the crosslinking reaction takes place when contacted with moisture in the air and it is apparent that the crosslinking reaction proceeds with the fluorine-containing copolymer alone. However, when the copolymers are used as coating materials, silanol condensation catalysts may be previously added to the coating compositions or may be added to the coating compositions just before application to accelerate the curing of the films of the fluorine-containing copolymer applied to substrates. In this case, when organic solvent solutions containing the fluorine-containing copolymers and the silanol condensation catalysts are applied to the substrates, a curing reaction takes place as soon as the copolymers are brought into contact with moisture in the air by the evaporation of the organic solvents, whereby the film is cured.

Usable silanol catalysts are those publicly known, for example, metal salts of carboxylic acids such as dibutyl tin dilaurate, dioctyl tin dilaurate, stannous acetate, stannous octanoate, lead naphthenate, iron 2-ethylhexanoate and cobalt naphthenate; organic bases, for example, ethylamine, hexylamine, dibutylamine and piperidine; and acids such as inorganic acids and organic fatty acids. Among them, alkyl tin salts of carboxylic acids such as dibutyl tin dilaurate, dioctyl tin dilaurate, dibutyl tin dioctoate and dibutyl tin diacetate are preferred.

The crosslinking reaction of the fluorine-containing copolymers of the present invention proceeds well at ordinary temperature, namely, at about room temperature (0° to 40° C.). However, the crosslinking reaction may be carried out under heating, if desired.

The coating compositions containing the fluorine-containing copolymer of the present invention can be applied in the same manner as in ordinary liquid coating composition onto the surfaces of metal, wood, plastics, ceramics, paper and glass with brush, spray or roller coater. The coating films of the present copolymer coating compositions, after curing, are excellent in weathering resistance, chemical resistance, solvent resistance, water resistance, heat resistance, low friction characteristics as well as in transparency, gloss and elongation.

In the present invention, a chlorine trapping agent is allowed to exist in the system during the course of the copolymerization reaction and/or the purification of the resulting copolymer in the production of the fluorine-containing copolymers as mentioned above. Concretely, it is preferred that the chlorine trapping agent is allowed to exist in the system during the copolymerization of (a) the chlorinated fluoroolefin with (b) the vinyl ether and (c) the organosilicon compound as mentioned above and the chlorine trapping agent is also allowed to exist in the system during the purification of the resulting fluorine-containing copolymer with organic solvents such as alcohols.

The following compounds can be used as chlorine trapping agents (chlorine-capturing agents).

[A]: Composite compounds represented by the following formula $$M_xAl_y(OH)_{2x+3y-2z}(A)_z \cdot aH_2O$$

wherein M is Mg, Ca or Zn, A is $CO_3$ or $HPO_4$, x, y and z are each a positive number, and a is 0 or a positive number.

Concrete examples of the composite compound (A) include the following compounds.

$$Mg_6Al_2(OH)_{16}CO_3 \cdot 4H_2O$$

$$Mg_8Al_2(OH)_{20}CO_3 \cdot 5H_2O$$

$$Mg_5Al_2(OH)_{14}CO_3 \cdot 4H_2O$$

$$Mg_{10}Al_2(OH)_{22}CO_3 \cdot 4H_2O$$

$$Mg_6Al_2(OH)_{16}HPO_4 \cdot 4H_2O$$

$$Ca_6Al_2(OH)_{16}CO_3 \cdot 4H_2O$$

$$Zn_6Al_6(OH)_{16}CO_3 \cdot 4H_2O$$

The composite compounds represented by [A] may be those which are not accurately represented by the formula described above, namely, may be compounds where part of OH groups is substituted by $CO_3$, for example, compounds where part of OH groups of $Mg_2Al(OH)_9 \cdot 3H_2O$ is substituted by $CO_3$. Crystal water may be removed from these compounds.

Among these composite compounds, preferable are those in which M is Mg and A is $CO_3$.

[B]: Basic compounds of alkaline earth metals

Concrete examples of usable basic compounds of alkaline earth metals include alkaline earth metal oxides such as MgO and CaO, alkaline earth metal hydroxides such as $Mg(OH)_2$ and $Ca(OH)_2$ and alkaline earth metal carbonates such as $MgCO_3$ and $CaCO_3$.

These basic compounds of alkaline earth metals may be in the form of double salts such as $(MgCO_3)_4 \cdot Mg(OH)_2 \cdot 5H_2O$, or crystal water may be removed from these compounds.

Among these basic compounds of alkaline earth metals, Mg-containing compounds are preferred.

[C]: Epoxy group-containing compounds

Examples of the epoxy group-containing compound include silicon-containing epoxy compounds such as γ-glycidoxypropyltrimethoxysilane and β-(3,4-epoxycyclohexyl)ethyltrimethoxysilane and aliphatic epoxy compounds such as trimethylolpropane polyglycidyl ether and neopentyl glycol diglycidyl ether.

Among them, the silicon-containing epoxy compounds such as γ-glycidoxypropyltrimethoxysilane are preferred.

Among the above-described chlorine trapping agents, the inorganic chlorine trapping agents are preferred, because the reaction of the inorganic compounds as the chlorine trapping agents with chlorine (hydrochloric acid) is rapid as compared with the organic compounds as the chlorine trapping agents and the inorganic compounds are not dissolved in the copolymerization system or the purification system and hence they are easily removed from the process line to the outside. Particularly, the composite compounds represented by A are preferred.

The chlorine trapping agents as mentioned above are allowed to exist during the copolymerization reaction and/or the purification of the resulting copolymer, whereby the resulting fluorine-containing copolymers can be effectively prevented from being colored. Particularly, when the chlorine trapping agents are allowed to exist in the system during the copolymerization reaction, the resulting fluorine-containing copolymers can be effectively prevented from being colored.

Further, when the chlorine trapping agents are allowed to exist in the system during the purification treatment of the resulting fluorine-containing copolymers with alcohols, substrates can be effectively prevented from being rusted when coatings comprising the fluorine-containing copolymers dissolved in organic solvents such as toluene are applied to substrates such as metal to form a coating film.

When the chlorine trapping agents are used during the copolymerization reaction, the agents are used in an amount of preferably 0.5–100 g, more preferably 1–70 g per mol of chlorine atom in the fluoroolefin (a).

When the chlorine trapping agents are used during the purification, the agents are used in an amount of preferably 0.5–100 g, more preferably b 1–70 g per 100 g of the resulting fluorine-containing copolymer.

Organic solvents which are used for the purification of the fluorine-containing copolymers are preferably alcohols such as methanol, ethanol, propanol, isopropanol, n-butanol, isobutanol and tert-butanol.

In the present invention, the fluorine-containing copolymers can be produced by conventional known methods except that the above-described chlorine trapping agents are allowed to exist in the copolymerization reaction system and/or in the purification system. Namely, the fluorine-containing copolymers of the present invention can be produced by copolymerizing the above-mentioned monomer components (a) to (c) in the presence of known radical initiators. In this case, all the components (a)–(c) must be present, and no copolymerization will take place, for example, if only the components (a) and (c) are present, but by the addition of the component (b), the components (a), (b) and (c) are copolymerized.

Usable as radical initiators in this copolymerization are various kinds of known initiators. Useful initiators concretely include organic peroxides and organic peresters, such as benzoyl peroxide, dichlorobenzoyl peroxide, dicumyl peroxide, di-tert-butyl peroxide, 2,5-dimethyl-2,5-di(peroxybenzoate)hexine-3, 1,4-bis(tert-butylperoxyisopropyl)benzene, lauroyl peroxide, tert-butyl peracetate, 2,5-dimethyl-2,5-di(tert-butylperoxy)-hexine-3, 2,5-dimethyl-2,5-di(tert-butylperoxy)hexane, tert butyl perbenzoate, tert-butylperphenyl acetate, tert-butyl perisobutyrate, tert-butyl per-sec octoate, tert-butyl perpivalate, cumyl perpivalate and tert-butyl perdiethyl acetate and azo compounds such as azobisisobutyronitrile and dimethyl azoisobutyrate. Of these organic peroxides, preferable are dialkyl peroxides such as dicumyl peroxide, di-tert-butyl peroxide, 2,5-dimethyl-2,5-di(tert-butylperoxy)hexine-3, 2,5-dimethyl-2,5-di(tertbutylperoxy)hexane and 1,4-bis(tertbutylperoxyisopropyl)benzene.

Preferably, the copolymerization reaction is carried out in a reaction medium comprising organic solvents. The organic solvents used herein include aromatic hydrocarbons such as benzene, toluene and xylene, aliphatic hydrocarbons such as n-hexane, cyclohexane and n-heptane, halogenated aromatic hydrocarbons such as chlorobenzene, bromobenzene, iodobenzene and o-bromotoluene, and halogenated aliphatic hydrocarbons such as tetrachloromethane, 1,1,1-trichloroethane, tetrachloroethylene and 1-chlorobutane.

The copolymerization is effected in the above-mentioned solvent by the addition of $10^{-2}$ to $2 \times 10^{-3}$ mol, based on the total mol numbers of the monomers, of a radical initiator. The polymerization temperature employed is from $-30°$ to $+200°$ C., preferably $20°$ to $100°$ C.

By introducing a carboxyl group into the molecular chain of the fluorine-containing copolymers of the present invention, the resulting copolymers may be improved in affinity with organic pigments or the like. Concretely, an unsaturated carboxylic acid or a derivative thereof is graft-polymerized onto the copolymers of the present invention.

Examples of unsaturated carboxylic acids used for the purpose intended include such unsaturated carboxylic acids as acrylic acid, methacrylic acid, α-ethylacrylic acid, maleic acid, fumaric acid, itaconic acid, citraconic acid, tetrahydrophthalic acid, methyltetrahydrophthalic acid, endcis-bicyclo[2.2.1]hepto-5-en-2,3-dicarboxylic acid (nadic acid ®) and methyl-endocis-bicyclo[2.2.1]hepto-5-en-dicarboxylic acid (methylnadic acid ®), and their derivatives such as halides, amides, imides, acid anhydrides and esters, i.e. malenyl chloride, maleimide, maleic anhydride, citraconic anhydride, monomethyl maleate, dimethyl maleate and the like.

The thus-obtained fluorine-containing copolymers may be purified with organic solvents such as alcohols in the presence of the above-described chlorine-trapping agent. Subsequently, the organic solvents and the residual monomers are removed to obtain the fluorine-containing copolymers. The thus-obtained copolymers are dissolved in organic solvents such as xylene. After solids are filtered, the viscosity of the organic solvent solution is adjusted to obtain fluorine-containing copolymer coating compositions.

As the field of the application of the fluorine-containing copolymers produced by the present invention, the copolymers can be suitably used as coating compositions after dissolving the copolymers in organic solvents. Furthermore, the coating compositions may be incorporated with pigments or dyes to formulate into colored coating materials and also may be incorporated with various kinds of additives commonly used in synthetic resins, if necessary. The above-described fluorine-containing copolymers may be used as modifiers for resins having alkoxysilyl or silanol groups such as silylated acrylic resins, silicone type coatings, silylated polyolefins, etc.

Fluorine-containing Copolymer Compositions

Secondly, the fluorine-containing copolymer compositions of the present invention are illustrated in detail below.

Each component to be contained in the fluorine-containing copolymer compositions will be first illustrated below.

Fluorine-containing Copolymers

The fluorine-containing copolymers used in the present invention are copolymers obtained by copolymerizing (i) a fluoroolefin, (ii) an alkyl vinyl ether, (iii) vinyl ester of a carboxylic acid and (iv) an organosilicon compound having an olefinically unsaturated bond and a hydrolyzable group. So long as the objects of the present invention are not marred, the copolymers may further be copolymerized with small amounts of other copolymerizable monomer components such as α-olefins, cycloolefins and allyl ester of carboxylic acids.

The fluoroolefin (i) has in the molecule at least one fluorine atom and chlorine atom and preferably includes perhaloolefins in which halogen atoms of the olefin have all been substituted with fluorine atoms, chlorine atoms and other halogen atoms. From the standpoint of polymerizability and the properties of the resulting polymers, fluoroolefins having 2 or 3 carbon atoms are preferred.

Examples of such fluoroolefins as mentioned above include fluoroolefins having two carbon atoms (fluoroethylene type) such as $CClF=CF_2$, $CHCl=CF_2$, $CCl_2=CF_2$, $CClF=CClF$, $CHF=CCl_2$, $CCl_2=CClF$, $CF_2=CF_2$, etc.; fluoroolefins having 3 carbon atoms (fluoropropene type) such as $CF_2ClCF=CF_2$, $CF_3CCl=CF_2$, $CF_3CF=CFCl$, $CF_2ClCCl=CF_2$, $CF_2ClCF=CFCl$, $CF_3CF=CF_2$, $CFCl_2CF=CF_2$, $CCl_3CF=CF_2$, $CF_3CF=CHCl$, $CClF_2CF=CHCl$, $CCl_3CF=CHCl$, $CF_2ClCF=CF_2$, $CH_2BrCF=CCl_2$, etc.; and fluoroolefins having 4 or more carbon atoms such as $CF_3CCl=CFCF_3$, $CF_3CF=CFCF_3$, $CF_2=CFCF_2CClF_2$, $CF_2=CFCF_2CCl_3$, $CH_2=CFCCl_2CCl_3$, $CF_3(CF_2)_2CCl=CF_2$, $CF_3(CF_2)_3CCl=CF_2$, etc.

Of these mentioned above, preferable are fluoroethylene and fluoropropene, and particularly preferable are chlorotrifluoroethylene($CClF=CF_2$).

These fluoroolefins may be used either alone or as a mixture of two or more of them in the present invention.

The alkyl vinyl ether (ii) signifies compounds having ether linkage of vinyl group with alkyl group.

Examples of such alkyl vinyl ethers as mentioned above include chain alkyl vinyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether and 4-methyl-1-pentyl vinyl ether, and cycloalkyl vinyl ethers such as cyclopentyl vinyl ether and cyclohexyl vinyl ether.

Of these mentioned above, particularly preferable are ethyl vinyl ether, propyl vinyl ether and butyl vinyl ether.

The use of alkyl vinyl ethers illustrated above either singly or in admixture is of course included in the embodiments of the present invention.

The vinyl ester of carboxylic acid (iii) signifies compounds having linkage of vinyl group with an ester group derived from a carboxylic acid having 2 to 6 carbon atoms.

Examples of such vinyl esters of carboxylic acids (iii) as mentioned above include vinyl acetate, vinyl propionate and vinyl butyrate.

Among them, vinyl acetate is particularly preferred.

These vinyl esters of carboxylic acids may be used either alone or as a mixture of two or more of them.

As the organosilicon compound (iv), the same compounds as the organosilicon compounds (c) described above can be used.

In the fluorine-containing copolymers used in the fluorine-containing copolymer compositions of the present invention, from structural units derived from (i) are present in an amount of 25-60 mol %, preferably 30-55 mol %, structural units derived from (ii) are present in an amount of 0-50 mol %, preferably 10-40 mol %, structural units derived from (iii) are present in an amount of 5-60 mol %, preferably 8-55 mol % and structural units derived from (iv) are present in an amount of 1-25 mol %, preferably 3-20 mol %, based on the total mole numbers of (i)-(iv).

The fluorine-containing copolymers are soluble at ordinary temperature in the above-described organic solvents.

The above-described fluorine-containing copolymers can be prepared by copolymerizing the aforementioned monomers (i) to (iv) in the presence of the above described radical initiators.

It is desirable that the above-described chlorine trapping agents are allowed to exist in the system during the copolymerization reaction and/or the purification of the resulting copolymers in the production of the copolymers by using chlorinated fluoroolefins as the fluoroolefin component in the present invention.

Curing Catalyst

The fluorine-containing copolymer compositions of the present invention contain curing catalysts to accelerate the curing reaction of the aforementioned fluorine-containing copolymers.

The curing catalyst used in the present invention can be represented by the following formula $$R^1\text{-}SnX^1X^2Y^1$$

wherein $R^1$ is an alkyl group having 4 to 10 carbon atoms, $X^1$ and $X^2$ may be the same or different and each is Cl or OH group, and $Y^1$ is Cl or $OCOR^2$ group (wherein $R^2$ is alkyl, aryl or allylalkyl group).

Concrete examples of such curing catalysts include n—$C_4H_9Sn(OH)_2Cl$, n—$C_4H_9Sn(OH)Cl_2$, n—$C_4H_9SnCl_3$, $C_8H_{17}Sn(OH)_2Cl$, $C_8H_{17}Sn(OH)Cl_2$, $C_8H_{17}SnCl_3$, n—$C_4H_9Sn(OH)_2OCOC_7H_{15}$, n—$C_4H_9Sn(OH)_2OCOC_{11}H_{23}$, n—$C_8H_{17}Sn(OH)_2OCOC_7H_{15}$, n—$C_8H_{17}Sn(OH)_2OCOC_{11}H_{23}$. Among them, $C_4H_9SnCl_3$, and $C_4H_9Sn(OH)_2OCOC_7H_{15}$ are preferred.

When the fluorine-containing copolymers are used in combination with the curing catalysts, coating films excellent in weathering resistance and adhesion to substrates can be obtained. Particularly, coating films excellent in adhesion to substrates can be obtained when coating materials comprising the fluorine-containing copolymer compositions containing the fluorine-containing copolymers of the present invention in combination with said curing catalysts are used in such a case that after a primer comprising epoxy resin is applied on the surface of a substrate and a considerably long period of time is allowed to elapse, and thereafter the fluorine-containing coating material is applied on the surface of the epoxy resin-coated film to form a fluorine-containing coating film.

Since the fluorine-containing copolymers of the present invention have the hydrolyzable organic radical originating from the organosilicon compound (iv), a crosslinking reaction takes place between the molecular chains of the copolymer when the copolymer is exposed to water, whereby the copolymer can be cured. Accordingly, the crosslinking reaction takes place by moisture in the air. However, it is preferred that the above-mentioned curing catalysts are used to accelerate the curing of the films of the fluorine-containing copolymers coated on the substrates.

The curing catalysts are used in an amount of 0.03-2.0 parts by weight, preferably 0.1-1.5 parts by weight per 100 parts by weight of the fluorine-containing copolymer.

Organic Solvents

Organic solvents capable of dissolving the fluorine-containing copolymers are used in the present invention, because the copolymers and the curing catalysts are dissolved to form homogeneous solutions which are then used as coating materials.

Examples of such organic solvents as mentioned above include toluene, xylene, butyl acetate, isobutyl methyl ketone, methyl cellosolve, ethyl cellosolve and mixtures thereof.

The organic solvents are used in an amount of 40-300 parts by weight, preferably 80-120 parts by weight per 100 parts by weight of the fluorine-containing copolymer.

Though the fluorine-containing copolymer composition of the present invention may be prepared by mixing all components such as the fluorine-containing copolymer, the curing catalyst and the organic solvent, the composition may be prepared by mixing a first solution of the copolymer dissolved in the organic solvent with a second solution of the curing catalyst dissolved in the organic solvent just before application.

Other Components

The fluorine-containing copolymer compositions of the present invention may optionally contain pigments, dyes, dehydrating agents (e.g., trimethyl orthoformate), dispersants and other additives (e.g., leveling agent, wetting agent, etc.), alkyl silicates and their oligomers and hydrolyzates (e.g., tetramethyl orthosilicate oligomer, etc.) in addition to the fluorine-containing copolymers, the curing catalysts and the organic solvents.

The fluorine-containing copolymer compositions of the present invention can be applied in the same manner as in ordinary liquid coating materials on the surfaces of substrates such as metal, wood, plastics, ceramics, paper and glass with brush, spray or roller coater. The coating films of the copolymers, after curing, are excellent in weathering resistance, chemical resistance, solvent resistance, water resistance, heat resistance, low friction characteristics as well as in transparency, gloss and elongation.

The curing reaction (crosslinking reaction) of the fluorine-containing copolymer compositions of the present invention proceeds well at ordinary temperature, i.e., at about room temperature (0° to 40° C.), but the reaction may be carried out under heating, if desired.

While the present invention will be illustrated by suitable examples, the present invention is not limited thereto unless otherwise indicated. Any change in embodiments can be made in the scope which does not impair the objects of the present invention.

EXAMPLE 1

A 1.5 liter (internal volume) autoclave equipped with a stainless steel stirrer was purged with nitrogen gas and charged with 180 ml of benzene, 106 g of ethyl vinyl ether (EVE), 21.0 g of n-butyl vinyl ether (BVE), 62.2 g of trimethoxyvinylsilane (TMVS) and 13.0 g of a calcined product (SHT) of synthetic hydrotalcite ($Mg_{4.5}Al_2(OH)_{13}CO_3.3.5H_2O$) powder under nitrogen gas stream. Thereafter, 257 g of chlorotrifluroethylene (CTFE) was introduced into the autoclave and the temperature was raised to 65° C.

To the thus-obtained mixture, there was fed an initiator solution of 7.6 g of dilauroyl peroxide dissolved in 120 cc of benzene over a period of 4 hours. Further, the reaction was carried out at 65° C. for 6 hours and the autoclave was cooled with water to stop the reaction.

After cooling, the unreacted monomers were expelled, and the autoclave was opened. The reaction mixture was taken out and placed in a 1.5 liter eggplant type flask.

To the reaction mixture 210 g of xylene, 120 g of methanol and 13.0 g of SHT were added. The mixture was heat-treated with stirring at 50° C. for 1.5 hours and further at 60° C. for 1.5 hours.

After the treatment, the residual monomers and the solvents were distilled off under reduced pressure by using an evaporator. To the residue 550 g of xylene was added and the mixture was stirred to form a homogeneous solution.

The solution was filtered to remove SHT and then concentrated under reduced pressure to obtain 366 g of a clear and colorless polymer.

The number average molecular weight of the resulting polymer (by GPC) was 10,000.

According to the analysis of the copolymer using elemental analysis and NMR, the molar ratio of CTFE/EVE/BVE/TMVS was found to be 50/37/6/7.

The degree of coloration of the thus obtained fluorine-containing copolymer was 6.4 when absorbance of light having a wavelength of 420 nm which is complementary color to yellow as measured in the following manner.

Method for Measuring Absorption of Light Having a Wavelength of 420 nm

In 100 parts by weight of xylene, 100 parts by weight of the fluorine-containing copolymer was dissolved to prepare a resin solution.

Absorbance of xylene was previously measured with light having a wavelength of 420 nm by using Multipurpose Recording Spectrophotometer MRS-2000 (manufactured by Shimadzu Seisakusho, Ltd.). The absorption of the above resin solution was measured. The absorption value of xylene was subtracted from the measured value of the resin solution The resulting value was referred to as absorbance of resin.

An approximate relationship between absorbance in this measurement and the criterion (Gardner No.) of the degree of coloration by visual observation was as follows.

| | | |
|---|---|---|
| Gardner No. 1 | Absorbance | $50 \times 10^{-3}$ |
| Gardner No. 2 | Absorbance | $100 \times 10^{-3}$ |

EXAMPLE 2

The procedure of Example 1 was repeated except that the amount of the chlorine trapping agent (hydrochloric acid trapping agent) was changed to obtain a copolymer. The amount of the chlorine trapping agent and the degree of coloration of the polymer are shown in Table 1.

EXAMPLE 3

The polymerization reaction was carried out in the same manner as in Example 1. After the autoclave was opened, subsequent operation was carried out in the following manner.

210 g of xylene was added. The residual monomers and the solvents were removed under reduced pressure by using an evaporator. To the residue 550 g of xylene was added and the mixture was stirred to form a homogeneous solution. The solution was filtered to remove SHT and then concentrated under reduced pressure to obtain a copolymer.

The degree of coloration of the resulting copolymer is shown in Table 1.

EXAMPLES 4 to 8

The procedure of Example 1 was repeated except that the kinds and amounts of the chlorine trapping agents and the amount of the alcohol were changed to obtain copolymers. The kinds and amounts of the chlorine trapping agents, the amounts of the alcohol added and the degree of coloration of the resulting copolymers are shown in Table 1.

EXAMPLE 9

The same polymerization apparatus as that used in Example 1 was used. The apparatus was purged with nitrogen gas and charged with 180 ml of benzene, 106 g of ethyl vinyl ether (EVE), 21.0 g of n-butyl vinyl ether (BVE), 79.9 g of triethoxyvinylsilane (TEVS) and 13.0 g of a calcined product (SHT) of synthetic hydrotalcite ($Mg_{4.5}Al_2(OH)_{13}CO_3.3.5H_2O$) powder under nitrogen gas stream. Thereafter, 257 g of chlorotrifluoroethylene (CTFE) was introduced into the autoclave and the temperature was raised to 65° C.

To the thus-obtained reaction mixture, there was fed an initiator solution of 7.6 g of dilauroyl peroxide dissolved in 120 cc of benzene over a period of 4 hours. Further, the reaction was carried out at 65° C. for 6 hours and the autoclave was cooled with water to stop the reaction.

After cooling, the unreacted monomers were expelled and the autoclave was opened. The reaction mixture was taken out and placed in a 1.5 liter eggplant flask.

To the reaction mixture, there were added 210 g of xylene, 173 g of ethanol and 13.0 g of SHT. The mixture was heat-treated with stirring at 50° C. for 1.5 hours and then at 60° C. for 1.5 hours.

After the treatment, the residual monomers and the solvents were distilled off under reduced pressure by using an evaporator. To the residue 550 g of xylene was added and the mixture was stirred to form a homogeneous solution.

The solution was filtered to remove SHT and then concentrated under reduced pressure to obtain 406 g of a polymer.

The degree of coloration of the resulting copolymer is shown in Table 1.

EXAMPLE 10

The same polymerization apparatus used in Example 1 was used. The apparatus was purged with nitrogen gas and charged with 180 ml of benzene, 106 g of ethyl vinyl ether (EVE), 21.0 g of n-butyl vinyl ether (BVE), 86.6 g of 3-vinyloxypropyltrimethoxysilane (VoPTMS) and 13.0 g of a calcined product (SHT) of synthetic hydrotalcite ($Mg_{4.5}Al_2(OH)_{13}CO_3.3.5H_2O$) powder under nitrogen gas stream. Thereafter, 257 g of chlorotrifluoroethylene (CTFE) was introduced into the autoclave and the temperature was raised to 65° C.

To the thus-obtained reaction mixture, there was fed an initiator solution of 7.6 g of dilauroyl peroxide dissolved in 120 cc of benzene over a period of 4 hours. Further, the reaction was carried out at 65° C. for 6 hours and the autoclave was cooled with water to stop the reaction.

After cooling, the unreacted monomers were expelled and the autoclave was opened. The reaction mixture was taken out and placed in a 1.5 liter eggplant flask. The residual monomers and the solvents were distilled off under reduced pressure by using an evaporator to obtain 380 g of a copolymer.

The degree of coloration of the resulting copolymer is shown in Table 1.

TABLE 1

| Example or Comp. Ex. | During polymerization chlorine trapping agent (g) | | ROH | During purification chlorine trapping agent (g) | | ROH | | Degree of coloration Absorption of light of 420 nm ($\times 10^{-3}$) |
| --- | --- | --- | --- | --- | --- | --- | --- | --- |
| Example 1 | SHT | 13 | omitted | SHT | 13 | MeOH | 120 | 6.4 |
| Example 2 | omitted | | omitted | SHT | 13 | MeOH | 120 | 9.8 |
| Example 3 | SHT | 13 | omitted | omitted | | omitted | | 10.0 |
| Example 4 | SHT | 4 | omitted | SHT | 4 | MeOH | 120 | 9.3 |
| Example 5 | SHT | 13 | omitted | SHT | 40 | MeOH | 40 | 9.9 |
| Example 6 | [1]MgO | 20 | omitted | MgO | 25 | MeOH | 120 | 7.3 |
| Example 7 | [2]KBM-403 | 40 | omitted | KBM-403 | 40 | MeOH | 120 | 6.9 |
| Example 8 | [3]KY1000 | 20 | omitted | KY1000 | 20 | MeOH | 120 | 7.8 |
| Example 9 | SHT | 13 | omitted | SHT | 13 | EtOH | 173 | 7.4 |
| Example 10 | SHT | 13 | omitted | SHT | 13 | MeOH | 120 | 6.6 |
| Comp. Ex. 1 | omitted | | omitted | omitted | | omitted | | 26.2 |

Note
[1]Manufactured by Kyowa Kagaku
[2]3-Glycidoxypropyltrimethoxysilane, manufactured by Shinetsu Chemical Industry Co., Ltd.
[3]SHT, $Mg_{4.5}Al_2(OH)_{13}CO_3.3.5H_2O$ clave and the temperature was raised to 65° C.

To the thus-obtained reaction mixture, there was fed an initiator solution of 7.6 g of dilauroyl peroxide dissolved in 120 cc of benzene over a period of 4 hours. Further, the reaction was carried out at 65° C. for 6 hours and the autoclave was cooled with water to stop the reaction.

After cooling, the unreacted monomers were expelled and the autoclave was opened. The reaction mixture was taken out and placed in a 1.5 liter eggplant flask.

To the reaction mixture, there were added 210 g of xylene, 120 g of methanol and 13.0 g of SHT. The mixture was heat-treated with stirring at 50° C. for 1.5 hours and further at 60° C. for 1.5 hours.

After the treatment, the residual monomers and the solvents were distilled off under reduced pressure by using an evaporator. 550 g of xylene was added to the residue and the mixture was stirred to form a homogeneous solution.

The solution was filtered to remove SHT and then concentrated under reduced pressure to obtain 448 g of a polymer.

The degree of coloration of the resulting copolymer is shown in Table 1.

COMPARATIVE EXAMPLE 1

The same polymerization apparatus used in Example 1 was used. The apparatus was purged with nitrogen gas and charged with 180 ml of benzene, 106 g of ethyl vinyl ether (EVE), 21.0 g of n butyl vinyl ether (BVE), and 62.2 g of trimethoxyvinylsilane (TMVS). Thereafter, 257 g of chlorotrifluoroethylene (CTFE) was introduced into the autoclave and the temperature was raised to 65° C.

REFERENTIAL PREPARATION EXAMPLE 1

A 1.5 liter autoclave equipped with a stainless steel stirrer was purged with nitrogen gas and charged with 180 ml of benzene, 43.6 g of trimethoxyvinylsilane (TMVS), 72.3 g of vinyl acetate (VAc), 69.6 g of ethyl vinyl ether (EVE) and 13 g of a calcined product (SHT) of synthetic hydrotalcite ($Mg_{4.5}Al_2(OH)_{13}CO_3.3.5H_2O$) powder under nitrogen gas stream. Thereafter, 256.9 g of chlorotrifluroethylene (CTFE) was introduced into the autoclave and the temperature was raised to 65° C.

To the thus-obtained mixture, there was fed an initiator solution of 7.6 g of dilauroyl peroxide dissolved in 120 ml of benzene over a period of 4 hours. Further, the reaction was carried out at 65° C. for 6 hours and the autoclave was cooled with water to stop the reaction.

After cooling, the unreacted monomers were expelled, and the autoclave was opened. The reaction mixture was taken out and placed in a 1.5 liter eggplant type flask.

To the reaction mixture, there were added 210 g of xylene, 120 g of methanol and 13.0 g of SHT. The mixture was heat-treated with stirring at 50° C. for 1.5 hours and further at 60° C. for 1.5 hours.

After the treatment, the residual monomers and the solvents were distilled off under reduced pressure by using an evaporator. To the residue 550 g of xylene was added and the mixture was stirred to form a homogeneous solution.

The solution was filtered to remove SHT and concentrated under reduced pressure to obtain 322 g of a clear and colorless product (I).

The number average molecular weight of the resulting polymer (by GPC) was 20,800.

According to the analysis of the copolymer using elemental analysis and NMR, the molar ratio of CTFE/EVE/VAc/TMVS was found to be 38/33/24/5.

According to the analysis of the copolymer using elemental analysis and NMR, the molar ratio of CTFE/EVE/BVE/TMVS was found to be 50/37/6/7.

EXAMPLE 11

A coating composition (I) comprising 35.5 parts by weight of the polymer (I) obtained in Referential Preparation Example 1, 1.7 parts by weight of tetramethyl orthosilicate oligomer, 1.7 parts by weight of methyl orthoformate, 29 parts by weight of titanium oxide and 32.1 parts by weight of xylene was prepared.

Separately, galvanized iron sheets (SPG) according to JIS-G-3302 coated with an epoxy primer Marine SC (manufactured by Mitsui Kinzoku Toryo Kagaku KK) was prepared and one of the coated sheets was allowed to stand in the outdoors one day and the other was allowed to stand in the outdoors for 10 days. In this way, substrates for coating were prepared.

One hundred parts by weight of the coating composition (I) prepared as described above was mixed with 2.7 parts by weight of a 3.3 wt. % xylene solution (A) of n—BuSn(OH)$_2$(OCOC$_7$H$_{15}$) to prepare a fluorine-containing copolymer composition. This composition was applied on said substrates with a 100 μm applicator.

The thus-obtained coating films were exposed to the outdoors for one week and then subjected to a cross-cut adhesive test.

The results are shown in Table 2.

REFERENTIAL EXAMPLE 2

Coating films were formed in the same manner as in Example 11 except that a 6.3 wt. % xylene solution (C) of di-n-butyl tin dilaurate was used in place of the 3.3 wt. % xylene solution (A) of n-13 BuSn(OH)$_2$(OCOC$_7$H$_{17}$). The coating films were exposed to the outdoors for one week and then subjected to a cross-cut adhesion test.

The results are shown in Table 2.

REFERENTIAL EXAMPLE 3

Coating films were formed in the same manner as in Example 11 except that the copolymer obtained in Example 1 was used in place of the copolymer (I). The coating films were exposed to the outdoors for one week and then subjected to a cross-cut adhesion test.

The results are shown in Table 2.

REFERENTIAL EXAMPLE 4

Coating films were formed in the same manner as in Example 11 except that the copolymer obtained in Example 1 was used in place of the copolymer (I) and the 6.3 wt. % xylene solution (B) of di-n-butyl in dilaurate was used in place of the 3.3 wt. % xylene solution (A) of n—BuSn(OH)$_2$(OCOC$_7$H$_{17}$). The coating films were exposed to the outdoors for one week and then subjected to a cross-cut adhesion test.

The results are shown in Table 2.

REFERENTIAL PREPARATION EXAMPLE 1

The procedure of Referential Preparation Example 1 was repeated except that the amounts of vinyl acetate (VAc) and ethyl vinyl ether were 36.2 g and 99.9 g, respectively, to obtain 325 g of a copolymer (II).

The number average molecular weight of the resulting polymer (by GPC) was 18,400.

According to the analysis of the copolymer using elemental analysis and NMR, the molar ratio of CTFE/EVE/VAc/TMVS was found to be 47/34/13/6.

EXAMPLE 12

Coating films were formed in the same manner as in Example 11 except that the amount of the 3.3 wt. % xylene solution (A) of n—BuSn(OH)$_2$(OCOC$_7$H$_{15}$) was changed to 1.8 parts by weight. The coating films were exposed to the outdoors for one week and then subjected to a cross-cut adhesion test.

The results are shown in Table 2.

EXAMPLE 13

Coating films were formed in the same manner as in Example 11 except that the copolymer (II) obtained in Referential Preparation Example 1 was used in place of the copolymer (I). The coating films were exposed to the outdoors for one week and then subjected to a cross-cut adhesion test.

The results are shown in Table 2.

EXAMPLE 14

Coating films were formed in the same manner as in Example 11 except that a 2.8 wt. % xylene solution (B) of monobutyltin trichloride was used in place of the 3.3 wt. % xylene solution (A) of n—BuSn(OH)$_2$(OCOC$_7$H$_{15}$). The coating films were exposed to the outdoors for one week and then subjected to a cross-cut adhesion test.

The results are shown in Table 2.

TABLE 2

| | Exposure time of substrate for coating (days) | Cross-cut test |
|---|---|---|
| Example 11 | 1 | 100 |
| | 10 | 100 |
| Example 12 | 1 | 100 |
| | 10 | 100 |
| Example 13 | 1 | 100 |
| | 10 | 100 |
| Example 14 | 1 | 100 |
| | 10 | 100 |
| Refer. Ex. 2 | 1 | 100 |
| | 10 | 0 |
| Refer. Ex. 3 | 1 | 100 |
| | 10 | 0 |
| Refer. Ex. 4 | 1 | 100 |
| | 10 | 0 |

What is claimed is:

1. A fluorine-containing copolymer composition comprising:
   [A] a fluorine-containing copolymer which is obtained by copolymerizing
      (i) a fluoroolefin,
      (ii) an alkyl vinyl ether,
      (iii) a vinyl ester of a carboxylic acid, and
      (iv) an organosilicon compound having an olefinically unsaturated bond and a hydrolyzable group,
   [B] a curing catalyst represented by the following formula $$R^1-SnX^1X^2Y^1$$

wherein $R^1$ is an alkyl group having 4 to 10 carbon atoms, $X^1$ and $X^2$ may be the same or different and each is Cl or OH group, and $Y^1$ is Cl or $OCOR^2$ (wherein $R^2$ is alkyl, aryl or allylalkyl group), and

[C] an organic solvent.

2. The fluorine-containing copolymer composition according to claim 1 wherein said curing catalyst is $C_4H_9SnCl_3$ or $C_4H_9Sn(OH)_2OCOC_7H_{15}$.

3. The fluorine-containing copolymer composition according to claim 1 wherein said organic solvent is toluene, xylene, butyl acetate, isobutyl methyl ketone methyl cellosolve or ethyl cellosolve.

4. The fluorine-containing polymer composition according to claim 1 wherein said fluoroolefin (i) is chlorotrifluoroethylene.

5. The fluorine-containing copolymer composition according to claim 1 wherein said vinyl ether (ii) is selected from the group consisting of ethyl vinyl ether, propyl vinyl ether, butyl vinyl ether, cyclohexyl vinyl ether and mixtures thereof.

6. The fluorine-containing copolymer composition according to claim 1 comprising
(i) 25-50 mol %,
(ii) 0-50 mol %,
(iii) 5-60 mol %, and
(iv) 1-25 mol % based on the total mole numbers of (i)-(iv).

7. The fluorine containing copolymer composition according to claim 1 wherein the vinyl ester of a carboxylic acid is vinyl acetate.

8. The fluorine-containing copolymer composition according to claim 1 wherein the organosilicon compound (iv) is represented by the formula $R^1SiY^1Y^2Y^3$ wherein $R^1$ is a vinyl group and $Y^1$, $Y^2$, $Y^3$ are the same and are either alkoxy or alkyoxyalkoxy groups.

9. The fluorine-containing copolymer composition of claim 1 wherein the curing catalyst is present in amounts of 0.1 to 1.5 parts by weight per 100 parts by weight of the fluorine-containing polymer.

10. The fluorine-containing polymer composition of claim 1 wherein the organic solvent is used in an amount of 80-120 parts by weight per 100 parts by weight of the fluorine containing polymer.

* * * * *